United States Patent Office 3,369,983
Patented Feb. 20, 1968

3,369,983
ELECTRODEPOSITION PROCESS USING PARTIAL-
LY ESTERIFIED OIL-ACID ADDUCTS
Donald P. Hart, Allison Park, and Joseph E. Plasynski,
Arnold, Pa., assignors to Pittsburgh Plate Glass Company, Pittsburgh, Pa., a corporation of Pennsylvania
No Drawing. Filed May 24, 1963, Ser. No. 282,880
8 Claims. (Cl. 204—181)

This invention relates to improved coating compositions adapted for use in electrodepositing films thereof on metals, and to the methods whereby such compositions are produced and electrodeposited.

Electrodeposition of certain materials, and the methods used for electrodepositing coatings have been known for some time. However, the types of materials heretofore used in electrodeposition processes have been necessarily limited because most of the compositions which ordinarily form desirable films and coatings cannot be satisfactorily applied in this manner, and the processes used to electrodeposit such compositions have been attended by serious disadvantages, such as poor flow of the deposited film and low throwing power. By "throwing power" is meant that property whereby different areas of the electrode to be coated receive substantially the same density of deposit, even though they are at appreciably different distances from the other electrode.

It has recently been discovered that certain specific coating compositions posses very desirable properties when used in electrodeposition processes, and that the coatings electrodeposited therefrom have excellent properties and can be applied easily and efficiently on a large scale. These coating compositions include those in which the vehicle comprises the partially neutralized reaction product of a drying oil fatty acid ester or a semi-drying oil fatty acid ester with an alpha, beta-ethylenically unsaturated dicarboxylic acid or an anhydride of such an acid. The compositions may also comprise the reaction product of the ester, acid or anhydride, and one or more other ethylenically unsaturated monomers. Many of these compositions are disclosed in copending application Serial No. 222,674, filed Sept. 10, 1962.

It has now been further discovered that a partially esterified reaction product of a fatty acid ester, an acid or anhydride, and optionally one or more other monomers, provides coating compositions having greatly improved properties when employed in electrodeposition processes. The partial esterification is carried out by reaction of the acidic component with a monohydric alcohol at any stage of the process prior to neutralization of all or part of the remaining acidic groups.

Among the advantages of the improved coating compositions of this invention is the obtention of better flow properties on baking, a problem often encountered in electrodeposition of coatings because of the high solids content of the film as deposited. In addition, it has been found that harder coatings are achieved with these new coating compositions, a quite unexpected improvement in view of the better flow which is also obtained. Other significant advantages include an ability to build heavier films during electrodeposition, improved throwing power during electrodeposition, and lower viscosity compositions, thereby providing ease of formulation and increased salt-spray resistance of the final coating.

The foregoing advantages are particularly important with respect to electrodeposited coatings. For this reason, and because the suitability of coating compositions for electrodeposition is both unpredictable and difficult to achieve, emphasis is placed herein upon the applicability of the compositions of this invention to electrodeposition processes. However, it should be noted that these compositions can also be applied by any conventional means, such as by brushing or rolling. Because they are water-dispersible, their application by dipping and their use, for example, as a dip primer, is advantageous in many instances, giving increased salt-spray resistance and other improved properties. Thus, it is not intended that the invention be limited by the discussion and examples herein relating to electrodeposition, although the usefulness of these compositions in such processes makes them especially valuable.

The improved compositions of the present invention comprise a modified reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed. Generally, drying oils are those oils which have an iodine value of about 130, and the semi-drying oils are those which have an iodine value of about 90 to 130, as determined by method ASTM-D1467-57T. Examples of such esters include linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil and the like.

Also included among such esters are those in which the esters themselves are modified with other acids, including saturated, unsaturated or aromatic acids, such as butyric acid, stearic acid, linoleic acid, phthalic acid, isophthalic acid, terephthalic acid or benzoic acid, or an anhydride of such an acid. One inexpensive acid material which has been found to produce good results in many instances is rosin, which is composed of chiefly abietic acid and other resin acids.

The acid modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols, such as trimethylolethane, trimethylolpropane, pentaerythritol, sorbitol and the like. If desired, the esters can also be modified with monomers such as cyclopentadiene or styrene, and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" and "semi-drying oil faty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides; semi-drying or drying oil fatty acid esters of polyols, such as butanediol, trimethylolethane, trimethylolpropane, trimethylolhexane, pentaerythritol and the like; and semi-drying or drying fatty acid esters of resinous polyols, such as homopolymers or copolymers of unsaturated aliphatic alcohols, e.g., allyl alcohol or methallyl alcohol, including copolymers of such alcohols with styrene or other ethylenically unsaturated monomers or with nonoil modified alkyd resins containing free hydroxyl groups.

Any alpha, beta-ethylenically unsaturated dicarboxylic acid or anhydride can be employed to produce the products described herein. These include such anhydrides as maleic anhydride, itaconic anhydride and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid may also be utilized, although in many instances it requires more stringent conditions than the unsaturated dicarboxylic acid anhydrides or acids which form anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction produce of the acid or anhydride with the fatty acid ester is not known with certainty, it is believed that the reaction takes place by addition of the unsaturated linkage of the acid or anhydride to the carbon chain of the oil. In the case of nonconjugated double bonds such as are present in linseed oil, the reaction may take place with the methylene group adjacent the nonconjugated double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion, and which may have other similar desirable characteristics. For this purpose, any ethylenically unsaturated monomer, preferably containing a single $CH_2=C<$ group, can be employed. Examples of such monomers include monoolefinic and diolefinic hydrocarbons, such as styrene, alpha-methyl styrene, alpha-butyl styrene, vinyl toluene, butadiene-1,3, isoprene and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl propionate, vinyl 2-chlorobenzoate, methyl acrylate, ethyl methacrylate, butyl methacrylate, heptyl acrylate, decyl methacrylate, methyl crotonate, isopropenyl acetate, vinyl alpha-bromo-propionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate and diethyl gultaconate; organic nitriles, such as acrylonitrile, methacrylonitrile and ethyacrylonitrile; and the like.

As is apparent from the above discussion and the examples set forth, which, of course, do not include all of the ethylenically unsaturated monomers which may be employed, any such monomer can be utilized. The preferred class of monomers used can be described by the formula:

(I)

where $R_1$ and $R_2$ are hydrogen or alkyl, $R_4$ is hydrogen alkyl or carboxyalkyl, and $R_5$ is cyano, aryl, alkyl, alkenyl, aralkyl, alkaryl, alkoxycarbonyl or aryloxycarbonyl. The preferred compounds are styrene, substituted styrenes, alkyl acrylates, alkyl methacrylates, diolefins and acrylonitrile.

The reaction of the fatty acid ester, the acid or anhydride, and any additional unsaturated monomer or monomers can be carried out concurrently, that is, with each of the components of the reaction product being mixed together and heated to reaction temperature, or the fatty acid ester can be reacted first with monomer and then with the acidic component. However, because the monomer and the acid or anhydride are often quite reactive with each other, the oil or other fatty acid ester is in most instances preferably first reacted with the acid or acid anhydride, and then this product is subsequently reacted with any ethylenically unsaturated monomer or monomers employed. For example, a reaction product of linseed oil, maleic anhydride and styrene is ordinarily prepared by first reacting maleic anhydride with linseed oil, and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 10 percent and about 45 percent by weight of the unsaturated acid or acid anhydride in reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reaction product, it is typically used in amounts between about 5 percent and about 35 percent by weight based upon the total weight of acid or anhydride and ester, with between 10 percent and 25 percent being used in those products preferred. Thus, in most instances, the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

The products produced in the above manner are comprised of polymeric chains of moderate length. The average molecular weight of the products to be used in electrodeposition should be low enough so that its flow characteristics at high solids are maintained, but high enough to provide adequate throwing power. The desirable molecular weight levels vary with the coating composition and conditions employed. Generally, those products having molecular weights of up to 10,000 or somewhat higher have given the best results.

The product obtained by reacting the fatty acid ester and the dicarboxylic acid or anhydride and the ethylenically unsaturated monomer, if any, is believed to contain recurrent groups derived from the dicarboxylic acid or anhydride and which can be represented by the following structure:

(II)

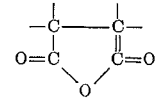

The improved compositions of the present invention are obtained by reacting the recurrent groups as described above with a monohydric alcohol, so as to esterify at least some, i.e., at least about 5 percent, of the carboxyl groups of the dicarboxylic acid (or the corresponding anhydride groups). These groups can be reacted with the alcohol either before or after the reaction with the fatty acid ester and any monomers. The preferred compositions have up to about 50 percent of the dicarboxylic acid carboxyl groups esterified, although higher proportions, up to about 80 percent, can be esterified in certain instances if so desired. The higher levels of esterification are best employed when a higher proportion of the dicarboxylic acid or anhydride is present; the esterified product should if possible have an acid value of at least about 30 prior to neutralization.

In the preferred compositions, all or part of the foregoing groups of the structure II are thus converted to groups which have the following structure:

(III) 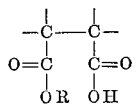

where R is an organic radical derived by elimination of the hydroxyl group from the alcohol employed. The partially esterified structure illustrated is known as the half-ester of the dicarboxylic acid group.

Essentially any monohydric alcohol can be employed to produce these half-esters, since the products of the invention are achieved with any monohydric alcohol which, when reacted with the acidic component, forms an ester which is not substantially hydrolyzed in water. The preferred alcohols are alkanols containing up to about 5 carbon atoms, including methanol, ethanol, 1-propanol, 2-propanol, 1-butanol, 2-methyl-1-propanol (isobutyl alcohol), 2-butanol, and 1-pentanol. Also quite advantageous are the lower alkyl monoethers of ethylene glycol and diethylene glycol, such as the monoethyl, monoethyl, monopropyl and monobutyl ethers of ethylene glycol (Cellosolves), and the corresponding monoethers of diethylene glycol (Carbitols). Other alcohols which may be utilized are longer chain alcohols, such as linseed fatty alcohol and other fatty alcohols; longer chain monoethers of glycols; cyclic alcohols, such as cyclopentanol, cyclohexanol and furfuryl alcohol; and aromatic alcohols, such as benzyl alcohol. When longer chain alcohols are employed, it is preferable to utilize relatively high levels of the acid or anhydride, in order to attain good dispersibility in water.

As indicated above, it is preferred that only up to about half of the carboxyl groups or the anhydride groups derived therefrom are esterified by reaction with the alcohol. This is relatively easily accomplished because the half-ester of all of the dicarboxylic acid moieties present is in most cases preferentially obtained upon reaction with an alcohol before the full ester of any of the dicarboxylic acid groups begins to be formed. In addition, production of the full ester generally requires more stringent conditions, such as higher temperatures, even when an excess of the alcohol is present. Even when only half of the acid groups are to be esterified, it is not necessary that each dicarboxylic acid form the half-ester. Thus, some of the dicarboxylic acid groups may be fully esterified. In actual practice, however, the half-esters of the dicarboxylic acid moieties are usually obtained, due to the preferential reactivity of the first carboxyl group in each dicarboxylic acid unit.

The esterification of the acidic groups can be carried out at any stage of the process. If desired, the acid or anhydride can be partially esterified and the half-ester (or other partial ester) then reacted with the fatty acid ester and any other monomer. Similarly, the acidic component can be reacted first with the fatty acid ester, then esterified with the monohydric alcohol, and this product then reacted with an additional monomer, or the unsaturated monomer can be reacted with the fatty ester and this product reacted with the unesterified or partially esterified acidic component. Thus, the invention does not reside in any particular mode of carrying out the reactions, and the advantageous properties of the products do not depend upon the manner or order in which the various components are coreacted so long as the final product has the composition described.

Generally, however, the esterification reaction with the alcohol is carried out by admixing the initial reaction product of the ester, the acid or anhydride, and any other monomer with the alcohol. The reaction at room temperature is quite slow, and thus it is preferred to heat the reaction mixture moderately. The preferred maximum temperature is that at which the full ester begins to be formed, which varies with the particular alcohol. In most cases, however, this maximum temperature is about 150° C.

The partially esterified product contains about half of the original acidity derived from the dicarboxylic acid. It is necessary to neutralize at least part of the remaining acidic groups in order to make the product usable in electrodeposition processes, and this is accomplished by reaction of the partially esterified product with a base. Inorganic bases, such as metal hydroxides or quarternary ammonium hydroxides, can be used, but it is preferred to employ organic bases, such as amines. Included within the term "amines" is ammonia, and in many cases ammonia is the preferred neutralizing base. Also quite effective is any basic primary or secondary amine. These include, for example, alkyl amines such as methylamine, ethylamine, propylamine, butylamine, amylamine, dimethylamine, diethylamine, dipropylamine, dibutylamine and N-methylbutylamine; cycloalkyl amines, such as cyclohexylamine; unsaturated amines, such as allyl amine, 1,2-dimethylpentenylamine and pyrrole; arylamines, such as aniline; aralkylamines, such as benzylamine and phenethylamine; alkarylamines, such as m-toluidine; cyclic amines, such as morpholine, pyrrolidine and piperidine; diamines, such as hydrazine, methylhydrazine, 2,3-toluenediamine, ethylenediamine, 1,2-naphthylene diamine and piperazine; and substituted amines, such as histamine, hydroxylamine, ethanolamine and diethanolamine. It has been found advantageous in many instances to effect part of the neutralization with a diamine and part with ammonia or one of the other foregoing amines. In other cases, improved properties may be obtained by effecting part of the neutralization with amines such as the aminoalkyl-alkanediols, for example, 2-methyl-2-amino-1,3-propanediol, 2-ethyl-2-amino-1,3-propanediol, or 2-methyl-2-amino-1,4-butanediol.

All or part of the remaining acidity of the product after the partial esterification is carried out can be neutralized. The extent of neutralization depends to some degree upon the proportion of acidic groups that have been esterified; the higher the level of esterification, the larger the proportion of the remaining acidity which should be neutralized. Generally, at least about 10 percent of the remaining acidity should be neutralized, and preferably at least about 25 percent is neutralized. The neutralization reaction is accomplished by mixing the neutralizing base with the partially esterified product. A water solution or other solution of the base may be used if desired, and moderately elevated temperatures are often employed.

When used in electrodeposition processes, the foregoing products can be employed as such to electrodeposit clear films, but ordinarily they are used as a vehicle along with a pigment composition and the coating composition is dispersed in water. The pigment composition used may be of any conventional type, comprising, for example, iron oxides, lead oxides, strontium chromate, carbon black, titanium dioxide, talc, barium sulfate and the like, as well as combinations of these and similar pigments. Usually, it is preferred that an inhibitive pigment, such as strontium chromate, be included. Color pigments, such as cadmium yellow, cadmium red, phthalocyanine blue, chromic yellow, toluidine red, hydrated iron oxide and the like, may be included if desired, as may be dispersing or surface-active agents. If a surface-active agent is used, it should be of a non-ionic or anionic type, or a combination of these types, since it is desirable to avoid the use of a cationic type surface-active agent.

Usually the pigment and the surface-active agent, if any, are ground together in a portion of the vehicle to make a paste, and this is blended with the vehicle to produce the coating composition. There may also be included in the coating composition additives, such as anti-oxidants, wetting agents, driers, anti-foaming agents, bactericides, suspending agents and the like.

It has been found that in most instances desirable coatings are obtained using pigmented compositions containing ratios of pigment-to-vehicle of not higher than about 1.5 to 1, and preferably not higher than about 1 to 1. If the composition has too high a pigment-to-vehicle ratio, the electrodeposited film may exhibit poor flow characteristics, and in many instances is noncontinuous and therefore subject to deterioration.

In formulating the coating composition, ordinary tap water may be employed. However, such water may contain a relatively high level of cations which, while not ordinarily rendering the process inoperative, may result in variations in the properties of the bath when used for electrodeposition. Thus, it is often desirable to utilize deionized water from which free ions have been removed, as by passage through an ion exchange resin, in making up the coating compositions of the invention, especially when the composition is intended for use in an electrodeposition process.

The compositions as described above can be applied in any conventional manner, but they are especially adapted to electrodeposition. In electrodeposition processes utilizing conductive metal anode and an electrically containing the composition is placed in contact with an electrically conductive metal anode and an electrically conductive cathode. The coating is deposited upon the anode, so that the metal substrate to be coated is used as the anode. It may be of any electrically conductive metal, such as iron, steel, aluminum, galvanized steel, phosphatized steel, zinc and the like. Upon the passage of electric current between the anode and the cathode, while in contact with the bath containing the coating composition, an adherent film of the coating composition is deposited upon the anode.

The conditions under which the electrodeposition process is carried out can be those conventionally used in the electrodeposition methods employed heretofore. The applied voltage may be varied greatly, and can be very low, e.g., 1 volt, or very high, e.g., 500 volts or even higher. It is typically between 50 volts and 350 volts. The current density depends on the area of the anode; the initial current density is usually between about 0.1 ampere per square foot and 15 amperes per square foot. The current generally decreases somewhat during electrodeposition.

It is desirable that the pH of the coating composition be as low as posisble, consistent with the desired level of neutralization, and preferably under about 8.0. There is a correlation between the extent of neutralization and the pH of the neutralized product, so that measurement of pH provides a convenient method of determining the approximate extent to which neutralization has taken place. However, the pH for any given level of neutralization varies with the nature of the components of the coating composition, that is, with the particular vehicle and pigment composition included therein. The nature of the alcohol used to effect the partial esterification also affects the pH; the longer the chain length of the alcohol employed, the higher the pH desired. The presence of an additional unsaturated monomer also increases the preferred pH level.

In some instances, either due to an inadvertent addition of excess neutralizing base, or to the particular characteristics of the reaction system involved, the resulting product has a pH above the desired level. When this occurs, it has been found that the pH may be conveniently lowered by the addition of an additional quantity of the partially esterified product that is unneutralized, or only slightly neutralized, i.e., products of the above type in which about 20 percent or less of the remaining acidity has been neutralized. The addition of the unneutralized or slightly neutralized resin not only effectively reduces the pH to a desired level, but unexpectedly does not deleteriously affect the stability or other properties of the coating composition when used in electrodeposition processes.

The problem of increased pH is especially encountered in continuous electrodeposition of the coating compositions of the invention. Thus, there is a tendency to build up a concentration of cations in the electrodeposition bath, and this is manifested by an increase in the pH of the bath. When this occurs, there is a subsequent deterioration in the quality of the deposited film. In addition to film degradation, the buildup in cations leads to a bath having higher conductivity, which in turn requires higher current densities to deposit films of a suitable thickness. This may be overcome by the addition of unneutralized or only slightly neutralized product to baths employed in continuous electrodeposition which lowers the pH of the bath without affecting the advantageous properties of the composition.

The concentration of the coating composition in the aqueous bath used in electrodeposition is not critical and relatively high levels of the coating composition can be used. However, it is ordinarily desirable to use as low a concentration of a coating composition as will give satisfactory results, and it is in this respect that the coating compositions of this invention are particularly advantageous. Baths containing as little as about 1 percent by weight of the coating composition in water can be employed, and in ordinary practice, the baths utilized usually contain between about 5 percent and about 10 percent by weight. Generally, it is preferred not to use more than about 20 percent by weight of the coating composition in the bath.

Electrodeposition produces an adherent film which is very high in solids content, often 90 percent to 95 percent or even higher, which provides the important advantage that the film will not readily run or wash. The article so coated can be used, if desired, without additional baking or other drying procedures; if it is desired to carry out an additonal baking or drying of the film, this is easily accomplished inasmuch as there is little or no solvent to be evaporated from the film. When this is done, baking temperatures of about 100° C. to 200° C. for about 10 minutes to 30 minutes are usually used.

The optimum voltages and current densities used may vary depending upon the coating composition used and the particular characteristics desired in the finished coating. Thus, it has been found that thicker films are generally obtained with higher voltages, and that greater throwing power results from use of higher voltages for given film thickness. Usually a maximum film thickness can be obtained with any given composition, and this depends upon the conductivity of the bath containing the composition, which in turn depends largely upon the extent of neutralization. However, any of the compositions described above will produce satisfactory coatings having sufficient adherency and thickness using the ordinary methods and conditions heretofore used in electrodeposition processes.

Below are several specific examples of the invention. Examples 1 to 5 demonstrate the manner in which the vehicles are produced and incorporated into coating compositions; Examples 6 to 12 illustrate the electrodeposition of films of such compositions. These examples, however, are not to be construed as limiting the invention to their details.

*Example 1*

A 5-liter reactor was charged with 2280 parts of linseed oil and 720 parts of maleic anhydride, heated to 220° C. and held at that temperature for about 3 hours. It was then sparged with an inert gas for 10 minutes and cooled. Partial esterification of the product was carried out by adding 233.5 parts of methanol slowly to 2500 parts of the foregoing product at 80° C. After 2½ hours, during which the temperature was raised to 95° C., the mixture was sparged with inert gas for 10 minutes and cooled. Neutralization was then carried out by mixing 1500 parts of partially esterified product with 80 parts of a 28 percent solution of ammonia in water and 2100 parts of deionized water. The product had a pH of 6.85 and a non-volatile solids content of 39.8 percent.

A pigment composition was made by grinding the following for 16 hours in a steel ball mill to form a paste.

| | Parts by weight |
|---|---|
| Vehicle made above (39.8 percent solids) | 118.5 |
| Deionized water | 220 |
| Dispersing agent (Witco 912, a combination oil-soluble sulfonate and nonionic surfactant) | 5.6 |
| Red iron oxide | 513.9 |
| Carbon black | 28.0 |
| Strontium chromate | 19.1 |

To this pigment paste there were added 188.5 parts of the vehicle solution above, whereupon the pigment composition produced was comprised of 9.44 percent vehicle solids and 54.51 percent pigment solids.

A water-dispersed coating composition was prepared from the above vehicle and pigment composition by mixing 407 parts of the vehicle solution with 197 parts of the pigment composition and 2996 parts of deionized water, with the addition of 1.8 parts of cresol as an anti-oxidant.

Example 2

A reaction product of maleic anhydride and linseed oil was made and partially esterfied as in Example 1. This product was neutralized by mixing 150 parts of the partially esterified adduct with 8 parts of a 28 percent solution of ammonia in water and 210 parts of deionized water. A clear, unpigmented, water-dispersed coating composition was then produced from this vehicle by mixing it with 2632 parts of deionized water.

Example 3

A 5-liter reaction vessel was charged with 2400 parts of linseed oil and 600 parts of maleic anhydride. This mixture was heated to 220° C. and maintained at that temperature for 1½ to 3 hours or until the viscosity was about 20,000 centipoises at 25° C. It was then sparged with inert gas for 15 minutes and cooled to 150° C. There were then added 1.5 parts of ditertiary butyl peroxide and, while maintaining the reaction mixture at 150° C. to 155° C., a mixture of 750 parts of styrene and 7.5 parts of ditertiary butyl peroxide was slowly and uniformly added over a period of 4 hours. When the addition was complete, 3.75 parts of ditertiary butyl peroxide were added and the mixture was heated at 160° C. for 1 hour. The temperature was raised gradually to 200° C. and maintained for ½ hour. The mixture was then sparged with inert gas for ½ hour and cooled.

Esterification of the foregoing product was carried out by mixing 2500 parts of the above product with 135 parts of methanol. This mixture was stirred and heated slowly to 90° C. over a period of 1½ hours, and maintained at 90° C. to 95° C. for an additional 1½ hours. It was then sparged with an inert gas for 20 minutes and cooled. The product thus obtained was neutralized by mixing and stirring 150 parts thereof with 210 parts of deionized water and 7 parts of 28 percent ammonia in water. The vehicle thus produced had a solids content of 40.8 percent.

A coating composition was then produced from the foregoing vehicle and a pigment composition comprised of 90 percent red iron oxide, 5 percent strontium chromate and 5 percent carbon black as the pigment solids, along with a dispersing agent which was ground in the foregoing vehicle. The ratio of pigment solids to vehicle solids of the coating composition produced was 0.4 to 1, and sufficient deionized water was added to make the total solids content of the resultant water-dispersed composition 7 percent.

Example 4

A reaction product of maleic anhydride, linseed oil and styrene was produced as in Example 3. The ethyl half-ester of this product was then produced by mixing 3000 parts of the reaction product with 258 parts of ethanol and heating this mixture to 100° C. After 1 hour at this temperature, the mixture was sparged with an inert gas for 15 minutes and cooled. The esterified product was then neutralized by adding 2500 parts thereof to a solution of 83 parts of 28 percent ammonium hydroxide and 3000 parts of deionized water. After stirring, there were added an additional 1500 parts of deionized water and sufficient ammonium hydroxide to make the pH 7.25, and the resultant product filtered. The vehicle thus produced had a solids content of 34.5 percent.

A pigment composition was produced by adjusting the pH of 202.4 parts of the foregoing vehicle to 9.0 with ammonium hydroxide and then adding 4 parts of a dispersing agent (Witco 912), 390 parts of red iron oxide and 10 parts of strontium chromate. This mixture was ground in a steel ball mill for 16 hours and then 99.2 parts of the vehicle were added and this mixture was ground for an additional 30 minutes. The resulting pigment paste was comprised of 13.3 percent vehicle solids and 56.7 percent pigment solids.

A water-dispersed coating composition was produced from the foregoing vehicle and pigment paste by mixing 158.4 parts of the foregoing pigment paste with 645.1 parts of the vehicle and 2409 parts of deionized water, along with 3.83 parts of an anti-oxidant. The total solids content of the composition was 10 percent.

Example 5

A reaction product made as in Example 3 from maleic anhydride, linseed oil and styrene was esterified by reacting 3291 parts of the resinous material with 407 parts of isobutanol at 115° C. for 1 hour. After sparging this with an inert gas for 20 minutes, 3000 parts of the product obtained were mixed with 3600 parts of deionized water and 100 parts of 28 percent ammonium hydroxide. This product was then mixed with sufficient deionized water to make the total solids content 5 percent, whereby there was produced a clear, unpigmented coating composition.

The foregoing examples illustrate the method of producing vehicles and coating compositions in accordance with the invention. The following examples demonstrate the method and practice of carrying out the electrodeposition of the coating compositions described above, and illustrate the nature and advantages of the results obtained therefrom.

Examples 6 to 12

In carrying out each of these examples, the coating composition employed was placed in a magnetically stirred, 1-gallon polyethylene container. The electrodes used were 4-inch by 12-inch phosphatized steel (Bonderite) panels, and an electromotive force was applied between the electrodes from a 0 to 1000-volt industrial rectifier (Dresser Electric). The electrodes were spaced 2 inches apart in the bath and were immersed in the coating composition to a depth of 6 inches. The throwing power of a particular coating composition was determined by first carrying out an electrodeposition using a single panel as the cathode and another single panel as the anode, using sufficient voltage and time to give a film of 1 mil thickness on the anode. The single anode panel was then replaced with three panels joined at the bottom and separated at the top by shims 4 inches by 4 inches, beveled from ¼ inch in thickness at the top to ⅛ inch at the bottom. The electrodeposition was then repeated with the conditions which gave a 1 mil thick coating. The throwing power of the bath is defined as that percentage of the immersed portion of the center panel of the anode upon which an adherent film had been deposited. The coatings were then dried by baking and the properties of the deposited film determined using standard procedures. Table I below sets forth the data obtained from the various tests carried out in the above manner.

TABLE I

| Ex. No. | Coating Composition as in Example No. | Pigment to Vehicle Ratio | Concentration in Water (percent solids) | Bath, pH | Applied EMF (volts) | Current (amp.) | Bath Temp. (° F.) | Deposition Time (sec.) | Throwing Power (percent) | Baking Temp. (° F.) | Baking Time (min.) | Film Hardness (pencil) |
|---|---|---|---|---|---|---|---|---|---|---|---|---|
| 6 | 1 | 0.6/1 | 8 | 6.6 | 150 | 2.1–1.35 | 96 | 90 | 90–95 | 350 | 20 | B |
| 7 | 2 | | 5 | 6.7 | 110 | 1.4–0.6 | 88 | 90 | | 350 | 20 | 6B+ |
| 8 | 2 | | 5 | 6.7 | 110 | 1.4–0.6 | 88 | 120 | | 350 | 20 | 6B+ |
| 9 | 3 | 0.4/1 | 7 | 7.8 | 220 | 2.2–1.25 | 90 | 60 | 85–90 | 350 | 20 | B–HB |
| 10 | 3 | 0.4/1 | 7 | 7.8 | 190 | 1.9–1.1 | 92 | 90 | 90–95 | 350 | 20 | B |
| 11 | 4 | 0.4/1 | 10 | 7.3 | 170 | 3.3–1.9 | 86 | 90 | 95 | 350 | 20 | 5B |
| 12 | 5 | | 5 | 7.5 | 220 | 2.0–1.1 | 74 | 90 | | 350 | 20 | B–3B |

As indicated above, the compositions of the invention, while especially efficacious for electrodeposition, can also be used to produce coatings having advantageous properties utilizing more conventional application techniques. For example, the coating composition of Example 2, when drawn on a phosphatized steel panel with a 3-mil drawdown bar and then air dried for ½ hour and baked at 350° F. for 30 minutes, produced a hard, adherent film of excellent properties. The film was about 1 mil thick and had a 4B pencil hardness. Similar results are attained by applying coatings by brushing, spraying or dipping, and then baking.

According to the provisions of the patent statutes, there are described above the principle of the invention and what are now considered to be its best embodiments. However, within the scope of the appended claims, it is to be understood that the invention can be practiced otherwise than is specifically described.

We claim:

1. In a method of coating a metal substrate which comprises passing an electric current between an electrically conductive metal anode and an electrically conductive cathode in contact with an aqueous bath comprising a partially esterified and partially neutralized product of a fatty acid ester and an acidic compound, the additional step of adding to said bath a composition comprising a vehicle which comprises a reaction product of an ester selected from the class consisting of drying oil fatty acid esters and semi-drying oil fatty acid esters with at least one acidic compound selected from the group consisting of anhydrides of alpha, beta-ethylenically unsaturated dicarboxylic acids, alpha, beta-ethylenically unsaturated dicarboxylic acids which form anhydrides, said reaction product having up to about half of the acidic carboxyl groups esterified by reaction with a water-soluble monohydric alcohol and up to about 20 percent of the unesterified acidic carboxyl groups neutralized.

2. The step as in claim 1 in which the composition is added in amounts sufficient to maintain the pH of the water-dispersed coating composition between about 6.0 and about 7.5.

3. A method of coating a metal substrate which comprises passing electric current between an electrically conductive metal anode and an electrically conductive cathode in contact with an aqueous coating composition containing a dissolved vehicle consisting essentially of the reaction product of an ester selected from the class consisting of drying oil fatty acid esters and semi-drying oil fatty acid esters with at least one acidic compound selected from the group consisting of anhydrides of alpha, beta-ethylenically unsaturated dicarboxylic acids, alpha, beta-ethylenically unsaturated dicarboxylic acids which forms anhydrides, fumaric acid, and mixtures thereof, at least some of the acidic carboxyl groups of said acidic components having been esterified by reaction with a monohydric alcohol and at least about 10 percent of the unesterified acid carboxyl groups having been neutralized.

4. The method of claim 3 in which said reaction product contains between about 55 percent and about 90 percent by weight of said ester and between about 10 percent and about 45 percent by weight of said acidic compound and up to about 50 percent of the acidic carboxyl groups are esterified.

5. A method of coating a metal substrate which comprises passing an electric current between an electrically conductive metal anode and an electrically conductive cathode in contact with an aqueous coating composition containing a dissolved vehicle consisting essentially of a reaction product of an ester selected from the class consisting of drying oil fatty acid esters and semi-drying oil fatty acid esters with
   (a) at least one acidic compound selected from the group consisting of anhydrides of alpha, beta-ethylenically unsaturated dicarboxylic acids, alpha, beta-ethylenically unsaturated dicarboxylic acids, which form anhydrides, fumaric acid, and mixtures thereof, and
   (b) at least one ethylenically unsaturated monomer; at least some of the acidic carboxyl groups of said acidic compound having been esterified by reaction with a monohydric alcohol and at least about 10 percent of the unesterified acidic carboxyl groups having been neutralized.

6. The method of claim 5 in which said reaction product contains between about 35 percent and about 90 percent by weight of said ester, from about 60 percent to about 45 percent by weight of said acidic compound, and from about 5 percent to about 35 percent by weight of said ethylenically unsaturated monomer, and up to about 50 percent of the acidic carboxyl groups are esterified.

7. The method of claim 5 in which the coating composition contains water in an amount between about 80 percent and about 99 percent of the total weight thereof, and contains pigment in a weight ratio of pigment to vehicle no greater than about 1.5 to 1.

8. The method of claim 3 in which said coating composition contains water in an amount between about 80 percent and about 99 percent of the total weight thereof, and contains pigment in a weight ratio of pigment to vehicle not greater than about 1.5 to 1.

References Cited

UNITED STATES PATENTS

| | | | |
|---|---|---|---|
| 3,293,201 | 12/1966 | Shahade et al. | 260—23 |
| 3,297,557 | 1/1967 | Huggard | 204—181 |
| 2,957,837 | 10/1960 | Smith et al. | 260—22 |
| 3,055,869 | 9/1962 | Wilson et al. | 260—22 |
| 3,230,162 | 1/1966 | Gilchrist | 204—181 |

ROBERT K. MIHALEK, *Primary Examiner.*

JOHN H. MACK, *Examiner.*

E. ZAGARELLA, *Assistant Examiner.*